Inventors:
Ernst Sommerfeld,
Wilhelm Stäblein,
by Charles E. Tullar
Their Attorney.

Patented July 10, 1934

UNITED STATES PATENT OFFICE 1,966,224

TELEMETRIC DEVICE

Ernst Sommerfeld, Berlin-Neutempelhof, and Wilhelm Stäblein, Berlin-Hermsdorf, Germany, assignors to General Electric Company, a corporation of New York Application November 18, 1932, Serial No. 643,266
In Germany November 24, 1931

9 Claims. (Cl. 177—351)

Our invention relates to arrangements for indicating measurement values or controlling operations in response thereto at a distance, and concerns particularly telemetric devices of the impulse-duration type.

It is an object of our invention to provide wholly electrical means for transmitting indications, in which contacting pointers are eliminated and discharge tubes may be utilized for controlling the operation. Other and further objects will become apparent as the description proceeds.

In accordance with our invention in its preferred form, we provide means for transmitting electrical impulses and means for causing the transmission to take place during a time interval dependent in length upon the magnitude of the measured quantity. A receiving device is provided which produces a current during the transmission of signals, and the average current serves as an indication of the magnitude of the transmitted measurement. The transmitting device is controlled preferably by means of a discharge tube having a control grid. The control grid is subjected to two biasing voltages in series, one of which is negative and depends in magnitude upon the magnitude of the measured quantity, and the other of which is positive and varies with respect to time in accordance with a predetermined law. Accordingly, the negative bias is overcome after a time interval which depends upon the magnitude of the measured quantity. In this manner the discharge tube controls the transmission of electrical impulses dependent in duration on the magnitude of the measured quantity.

Figure 1:
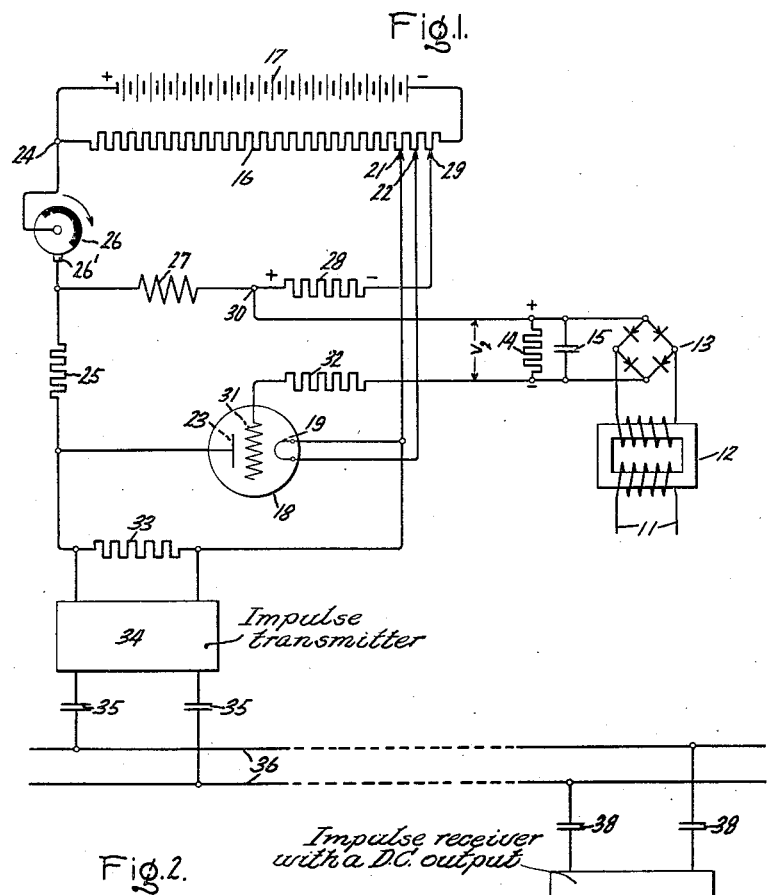
Figure 2:
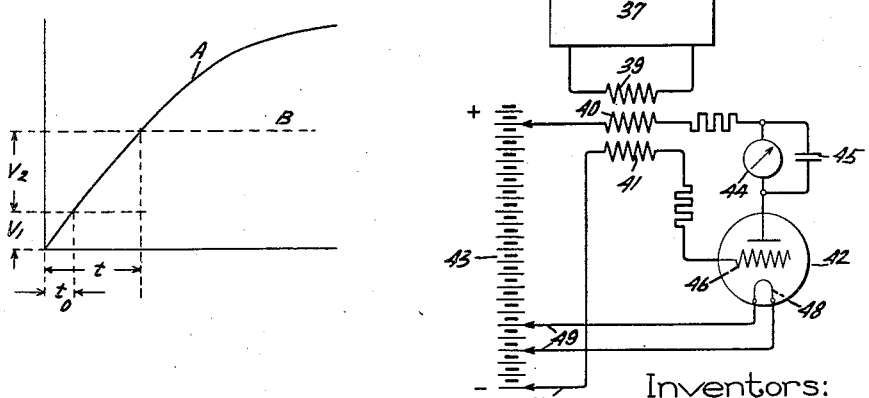
Figure 3:
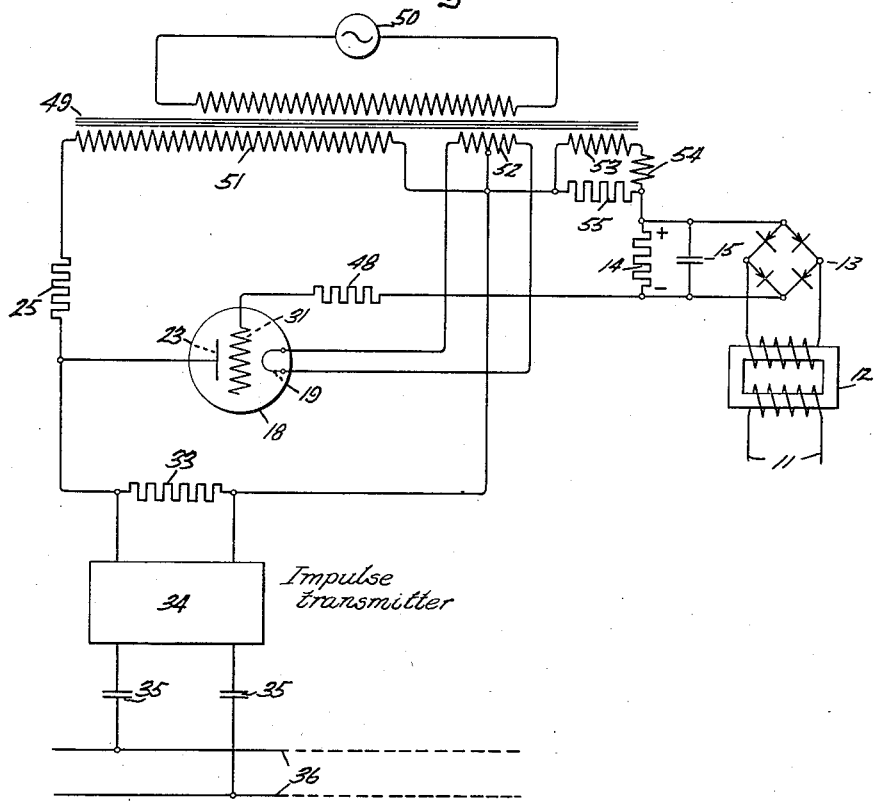
Figure 4:
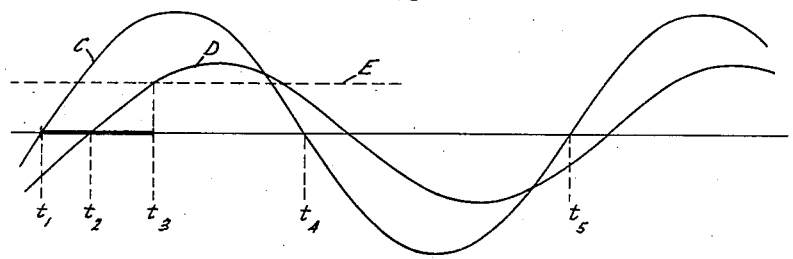

The features of our invention which we believe to be novel and patentable are pointed out in the claims appended hereto. A more complete understanding of our invention itself, however, may be obtained by referring to the following description in connection with the accompanying drawings in which Fig. 1 represents schematically the circuit diagram of one embodiment of our invention employing a direct-current power source; Fig. 2 is a curve illustrating the potential relationships in the grid circuit of the discharge tube employed in the embodiment illustrated in Fig. 1; Fig. 3 is a circuit diagram illustrating in part another embodiment of our invention in which the operating power is supplied by an alternating-current source; and Fig. 4 is a curve representing certain voltage relationships in the embodiment of Fig. 3.

Referring now more in detail to the drawings in which like reference characters refer to like parts throughout, we have shown an arrangement for indicating at a distance the values of an alternating voltage occurring between the conductors 11, but it will be understood that our invention is not limited to transmitting alternating voltage measurements but may be employed for the transmission of indications of any kind which may be translated into a current or a voltage whether direct or alternating.

In the arrangement shown in Fig. 1 the voltage occurring between the conductors 11 energizes the primary winding of a potential transformer 12, the secondary of which is connected to a suitable rectifying arrangement 13, e. g. a full wave copper oxide rectifier. The rectifier 13 serves to cause a direct current to flow through the resistor 14, which is proportional to the voltage between the conductors 11. The condenser 15 serves to shunt out any alternating-current components which may not have been stopped by the rectifier 13, thereby insuring that a substantially pure direct-current potential difference exists across the resistor 14.

The auxiliary voltages necessary for the operation of the apparatus are supplied by a potentiometer 16 connected to a suitable source of direct current 17. A device for controlling the conductivity of an electrical circuit in response to voltage variations, preferably a grid controlled vapor-electric discharge tube 18, is connected to the potentiometer 16. The cathode 19 of the discharge tube 18, which may be of the thermionic type, is connected to the taps 21 and 22 of the potentiometer 16, and the anode 23 of the discharge tube is connected to the positive terminal 24 of the potentiometer 16 in series with a current-limiting resistor 25 and a suitable interrupting device 26 which may take the form of a commutator driven at a suitable constant speed by means not shown. An inductive circuit comprising an inductance 27 and a resistor 28 in series with interrupter 26 is also connected to the potentiometer 16 between terminal 24 and tap 29 of the potentiometer 16, which is negative with respect to the taps 21 and 22. The resistor 14 is connected between common terminal 30 of inductance 27 and resistor 28 and the grid 31 of the discharge tube 18 in series, if desired, with a current-limiting resistor 32.

A resistor 33 is also connected to the potentiometer 16 in series with the interrupter 26 and current-limiting resistor 25. A device for transmitting electrical impulses, for example, a high-frequency generator of any desired type is provided having resistor 33 in its control circuit and is so arranged that the generation of impulses is initiated when and continues while the voltage across resistor 33 exceeds a predetermined value. The impulses generated by device 34 may be transmitted toward a remote station where measurement values are desired in any suitable manner, for example, by employing coupling condensers 35 to connect device 34 to a pair of conductors 36, which may, if desired, be conductors of a power transmission line. At the remote station there is provided a suitable receiving device 37 coupled to the conductors 36 by means of condensers 38. The receiving device 37 has a direct current output circuit in which is connected the primary winding of a transformer 39. The transformer 39 has a pair of secondary windings 40 and 41 connected in the plate and grid circuits, respectively, of a discharge tube 42. The tube 42 is supplied with a direct-current anode potential by means of a suitable source of direct current 43. The plate circuit of the tube 42 includes a current-responsive device, for example, an indicating device 44 shunted by a condenser 45 serving to smooth out current pulsations in the device 44. The grid 46 of tube 42 is connected in series with winding 41 to tap 47 of the direct-current source 43, and the filamentary cathode 48 of the tube 42 is connected to the taps 49 of the source 43 which are positive with respect to the tap 47 so that the grid 46 is normally biased negatively.

In the operation of our device, impulses are transmitted over the conductors 36 for a period or for portions of successive cycles dependent upon the magnitude of the quantity to be measured and to which the potential across resistor 14 is proportional.

Since the tap 29 is negative with respect to the tap 21, which determines the potential of cathode 19, and the grid 31 is connected to tap 29 in series with resistors 28, 14 and 32, the grid 31 is normally biased negatively with respect to cathode 19. When the voltage to be measured is applied to the conductors 11, a potential difference occurs across the resistor 14, which further biases the grid 31 negatively by an amount which is proportional to the magnitude of the measured quantity. When the circuit is closed through interrupter 26, current begins to flow to the inductance 27 and the resistor 28. Since the connections are such that the potential difference across the resistance 28 as applied at joint 30 is positive with respect to the grid 31, the potential difference in resistor 28 tends to overcome the negative biases applied to the grid 31. However, owing to the inductive nature of the circuit, the current through resistor 28 builds up gradually following the exponential curve A of Fig. 2 in which voltage, represented by vertical distances is plotted against time, represented by horizontal distances so that an appreciable time elapses before the negative bias of grid 31 is overcome and the tube 18 is permitted to conduct current. When the tube 18 becomes conducting, it acts as a short-circuit across resistor 33, reducing the potential difference across resistor 33 and causing cessation of the generation of impulses by device 34 which was initiated by the closing of the circuit by the interrupter 26. The electrical constants of the apparatus are preferably so chosen that in the portion of curve A within which the apparatus 34 operates, the curve A is substantially linear, and the time $t$ required for the grid 31 to become positively biased and terminate the generation of impulses by device 34 is substantially proportional to the magnitude of the negative bias represented in Fig. 2 by the distance between the horizontal dotted line B and the horizontal axis. The distance of the horizontal line B above the axis is determined by the sum of the voltages $V_1$ and $V_2$. $V_1$ represents the constant and normal negative grid bias supplied by tap 29, and $V_2$ the grid bias supplied by resistor 14, which varies in proportion to the quantity to be measured. Accordingly, when the measured quantity is zero, impulses will be transmitted for a predetermined interval $t_0$ from the time the contactor 26 closes, thereby furnishing an indication to the remote station that the device is in operation and the reading zero. The normal initial negative bias $V_1$ serves to insure that the tube 18 will be non-conducting at the beginning of each cycle even when the potential difference between the ends of the resistor 14 is relatively small or zero.

If desired, the indicating device 44 may be of the suppressed zero type in which the deflection of its movable element for current values corresponding to time periods up to $t_0$ is relatively small or zero, in order to obtain a scale which is as open as possible in the range for which readings are desired. However, it is ordinarily preferable to provide at least a slight deflection for current values corresponding to the time period $t_0$, in order that the observer at the receiving station may distinguish between a deflection corresponding to the transmission of a zero measurement, and a lack of deflection resulting from the apparatus in the transmitting station not being in operation, or from some portion of the apparatus being out of order.

When the transmission of impulses along conductors 36 commences, a direct current begins to flow in the primary winding of the transformer 39, and voltage impulses are produced in the secondary windings 40 and 41. The connections and electrical constants are such that the impulses are positive and the impulse in winding 41 overcomes the normal negative bias of grid 46, causing the tube 42 to become conducting and a current to flow through device 44. As is well known, after a vapor discharge becomes conducting it continues to conduct as long as the anode potential remains above a given positive value, even though the grid potential may again become negative. Consequently, current continues to flow through device 44 as long as the anode voltage is maintained at its normal value by source 43. At the cessation of impulses transmitted along conductors 36, current ceases to flow in primary winding 39, voltages are induced in windings 40 and 41 of polarity opposite to previously, the negative transient in winding 40 reduces the anode voltage below that necessary to maintain a discharge and the discharge through tube 42 and device 44 ceases. The relationship between the speed of interrupter 26 and the time intervals involved in the apparatus is such that the flow of current in device 44 ceases before interrupter 26 breaks the circuit. Accordingly, each time the circuit is made by interrupter 26, the cycle of operation just described is repeated and the average current flowing through current-responsive device 44 serves to provide continuous indications of the fraction of the cycle during which impulses are transmitted over conductors 36 and consequently also the magnitude of the measured quantity.

In the modification illustrated in part in Fig. 3, alternating current is utilized instead of intermittent direct current as a source of supply for the controlling circuit. A transformer 49 supplied by a suitable source of alternating current 50 replaces the potentiometer 16 of Fig. 1. Transformer 49 is provided with a secondary winding 51 supplying the plate circuit of the tube 18, a secondary winding 52 supplying the filament current of the tube and a secondary winding 53 supplying a circuit which furnishes a supplementary potential for opposing the grid bias supplied by the potential difference across resistor 14. An inductance 54 and a resistor 55 in series are connected to the winding 53, the resistor 55 being in series with resistor 14 in the grid circuit of the tube 18. Owing to the inductance of element 54, the current therein and in the resistor 55 lags behind the potential of windings 53 and 51. Consequently, the potential difference across the resistor 55 has a corresponding lag. There is impressed on grid 31 a negative direct-current potential and an alternating-current potential in series. Referring to Fig. 4, which is a curve of voltages plotted against time, the time axis being horizontal, the negative potential which is proportional to the magnitude of the measured quantity is represented by the distance of the horizontal line E above the horizontal axis, and the alternating potential supplied by resistor 55 is represented by the sine curve D, so drawn that positive potentials are shown above the horizontal axis so that the negative grid bias is overcome wherever the curve D rises above the horizontal line E. The anode potential supplied by winding 51 is represented by the curve C. It will be seen that regardless of the height of horizontal line E representing the value of the measured quantity, the potential of grid 31 will be negative between times $t_1$ and $t_2$ so that tube 18 cannot conduct during this period which corresponds to the period $t_0$ of Fig. 2. That is, the lag of curve D behind curve C, causing values of D to be negative from $t_1$ to $t_2$, serves the same purpose in this embodiment as the constant negative bias $V_1$ in the embodiment of Figures 1 and 2. From the time $t_2$ to $t_3$ which depends upon the height of horizontal line E representing the magnitude of the measured quantity, the tube 18 also remains non-conducting. Since the portion of the curve D between times $t_1$ and $t_3$ is substantially linear, the length of the interval during which tube 18 is non-conducting and impulses are transmitted along conductors 36 varies substantially linearly with the magnitude of the measured quantity. At the time $t_3$ the potential D exceeds potential E, the tube becomes conducting and the generation of impulses ceases. Owing to the character of the vapor discharge tube 18, the tube continues to conduct regardless of the grid potential to the time $t_4$ when the anode potential reverses. From the time $t_4$ to $t_5$, the tube remains non-conducting but the voltage supplied to resistor 33 also becomes negative so that the generation and transmission of impulses by device 34 is prevented. At the time $t_5$, the cycle is completed and the events initiated at the time $t_1$ are repeated, as just described. In this modification the receiving apparatus operates in the same manner as described in connection with the previous embodiment.

In accordance with the provisions of the patent statutes, we have described the principle of operation of our invention, together with the apparatus which we now consider to represent the best embodiment thereof, but we desire to have it understood that the apparatus shown is only illustrative and that the invention may be carried out by other means.

What we claim as new and desire to secure by Letters Patent of the United States is:

1. A telemetric device comprising a device for transmitting electrical impulses, a source of voltage controlling the energization of said transmitting device, a vapor discharge tube connected across said voltage source so as to short-circuit said source when said tube is conducting and having a control grid, means for producing a direct voltage proportional to a measurement to be transmitted, said voltage producing means being connected so as to bias negatively the grid of said tube, means for producing a positive direct voltage which increases in value gradually, said means also being connected to the grid of said tube so that said negative bias is overcome by said positive voltage after an interval dependent upon the magnitude of the measured quantity, thereby causing said tube to become conducting, to short-circuit said controlling voltage source and to interrupt the operation of said transmitting device, a remote receiving device, a second vapor discharge tube having a normally negatively biased control grid connected to and controlled by said receiver so that the latter tube becomes conducting during the reception of said electrical impulses, a source of current and a current responsive device connected to said source in series with said second tube, whereby said current-responsive device provides a response dependent upon the total current flowing therethrough, which is determined by the magnitude of the transmitted measurement and the duration of said transmitted impulses.

2. A telemetric device of the impulse-duration type comprising means having a voltage therein proportional to the magnitude of a measurement to be transmitted, means for producing a voltage varying with respect to time in accordance with a predetermined law, means for comparing said voltages and causing the transmission of electrical impulses while one of said voltages exceeds the other, and receiving means for producing a response dependent upon the duration of the transmission of said impulses and consequently dependent upon the magnitude of said measurement.

3. A telemetric device of the impulse-duration type comprising a normally energized device for transmitting electrical impulses including a pair of control terminals, said device becoming deenergized when said terminals are connected through a low impedance, a discharge tube connected between said control terminals and having a control grid, means for applying a negative bias to said grid proportional to the magnitude of a measurement to be transmitted, means for adding to said negative grid bias a positive potential varying in a predetermined relationship with time, thereby retaining said tube non-conducting to permit the transmission of impulses while said negative bias exceeds said positive potential and rendering said tube conducting to prevent the transmission of impulses when said negative bias is exceeded by said positive potential, means for receiving said transmitted impulses, means responsive thereto for producing a current during the transmission of said impulses, and means responsive to the average value of said current, the average value of said current being dependent upon the duration of the transmission of said impulses and consequently upon the magnitude of the measurement to be transmitted.

4. A telemetric device comprising a normally energized device for transmitting electrical impulses including a pair of control terminals, said device becoming deenergized when said terminals are connected through a low impedance, a discharge tube connected between said control terminals, and having a control grid, means for normally applying a negative bias to said grid, means for applying an additional negative bias to said grid proportional to the magnitude of a measurement to be transmitted, means for adding to said grid biases a positive potential varying in a predetermined relationship with time, thereby retaining said tube non-conducting to permit the transmission of impulses while the sum of said negative biases exceeds said positive potential and rendering said tube conducting to prevent the transmission of impulses when the sum of said negative biases is exceeded by said positive potential, means for receiving said transmitted impulses, means responsive thereto for producing a current during the transmission of said impulses, and means responsive to the average value of said current, the average value of said current being dependent upon the duration of said impulses and consequently upon the magnitude of the measurement to be transmitted.

5. A telemetric device comprising a normally energized device for transmitting electrical impulses including a pair of control terminals, said device becoming deenergized when said terminals are connected through a low impedance, a discharge tube connected between said control terminals and having a control grid, means for applying a negative potential to said grid proportional to the magnitude of a measurement to be transmitted, means for applying to said grid in opposition to said negative potential an increasing positive potential, said latter means comprising an inductance and a resistor in series, and means for initiating a current through said inductance and said resistor, said resistor being included in the grid circuit of said tube, whereby said grid remains negative for a time determined by the magnitude of said measurement, said tube is retained non-conducting and the transmission of impulses is permitted only while said negative bias exceeds said positive potential difference, and means for receiving said transmitted impulses and providing a response dependent upon the duration of said transmitted impulses and consequently upon the magnitude of said transmitted measurement.

6. A telemetric device comprising a device for transmitting impulses having a control circuit including a pair of control terminals, a source of alternating current supplying said control circuit, said device being normally energized during positive half-cycles of said alternating source but becoming deenergized when said control terminals are connected through a low impedance, a discharge tube connected between said control terminals and having a control grid, means for applying a negative potential to said grid proportional to the magnitude of a measurement to be transmitted, means for adding to said negative potential an alternating potential having a predetermined time lag behind the potential of said alternating-current supply source, thereby making said tube conducting and terminating the transmission of impulses whenever the algebraic sum of said negative grid potential and said alternating grid potential becomes positive, means for receiving said transmitted impulses, means responsive thereto for producing a current during the transmission of said impulses, and means responsive to the average value of said current, the average value of said current being dependent upon the duration of said impulses and consequently upon the magnitude of the measurement to be transmitted.

7. An arrangement for defining a time interval dependent in length upon the magnitude of a given quantity, comprising in combination with a source of current a discharge tube having a control grid, means for applying to said grid a negative bias proportional to the magnitude of said given quantity, means for producing a positive potential increasing with respect to time in accordance with a predetermined law, said positive potential being arranged to oppose said negative grid bias, means for simultaneously connecting said discharge tube to said source of current and initiating the production of said positive potential, whereby after a time interval dependent upon the magnitude of said given quantity said negative grid bias is overcome and said tube is made conducting.

8. A telemetric device comprising in combination, a device for transmitting electrical impulses having a control circuit including a pair of control terminals, a source of intermittent direct current supplying said control circuit, said device being normally energized when said current source is energized but becoming deenergized when said control terminals are connected through a low impedance, a discharge tube connected between said control terminals, said tube having a control grid controlling the conductivity of said tube to control the transmission of said impulses, means for applying to said control grid a voltage proportional to the magnitude of a measurement to be transmitted, means for applying to said grid upon each energization of said intermittent source a voltage in opposition to said first-mentioned voltage and increasing with respect to time in accordance with a predetermined law so that the polarity of the grid potential is reversed after a time dependent upon the magnitude of said measurement and said transmitter operates for a period dependent in length upon said magnitude, and a receiver providing a response dependent upon the length of said transmission periods.

9. A telemetric device comprising a device for transmitting impulses having a control circuit including a pair of control terminals, a sourse of alternating current supplying said control circuit, said device being normally energized during positive half-cycles of said alternating current source but becoming deenergized when said control terminals are connected through a low impedance, a discharge tube connected between said control terminals and having a control grid, means for applying negative potential to said grid proportional to the magnitude of a measurement to be transmitted, means for adding to said negative potential an alternating potential thereby making said tube conducting and terminating the transmission of impulses whenever the algebraic sum of said negative grid potential and said alternating grid potential becomes positive, means for receiving said transmitted impulses, means responsive thereto for producing a current during the transmission of said impulses, and means responsive to the average value of said current, the average value of said current being dependent upon the duration of said impulses and consequently upon the magnitude of the measurement to be transmitted.

ERNST SOMMERFELD.
WILHELM STÄBLEIN.